INVENTOR
Ralph E. Taylor

BY [signature]
[signature]
ATTORNEYS

INVENTOR
Ralph E. Taylor
BY Thomas E. Coy
Earl Levy
ATTORNEYS

INVENTOR
Ralph E. Taylor

BY [signature]
[signature]
ATTORNEYS

INVENTOR
Ralph E. Taylor

BY [signature]
[signature]
ATTORNEYS

United States Patent Office 3,421,105

Patented Jan. 7, 1969

3,421,105
AUTOMATIC ACQUISITION SYSTEM FOR PHASE-LOCK LOOP

Ralph E. Taylor, Silver Spring, Md., assignor to the United States of America as represented by the Administrator of the National Aeronautics and Space Administration Filed Feb. 28, 1967, Ser. No. 619,907
U.S. Cl. 331—4 14 Claims
Int. Cl. H03b *3/04*

ABSTRACT OF THE DISCLOSURE

Disclosed is a system for phase locking onto an unknown carrier frequency signal located within a receiver band pass. A variable frequency source is heterodyned, to derive a beat frequency, wherein the output of a local oscillator is swept at a relatively rapid rate while the system is in an acquisition mode. The beat frequency is applied to a first filter having a response time to enable the beat frequency to dwell therein for a relatively long time period. In response to the filter output exceeding a predetermined value when the beat dwells in it for the long time period, the frequency scanning rate of the local oscillator is reduced. With the local oscillator scanning rate reduced, the beat is applied as a frequency control to the local oscillator and a phase locked tracking loop for the input is thereby formed. The beat frequency is applied to a second filter having a longer response time than the first filter. Only in response to the second filter output being above a selected value within a predetermined time interval after the first filter output is above the predetermined level, is the phase locked loop maintained.

Figure 1:
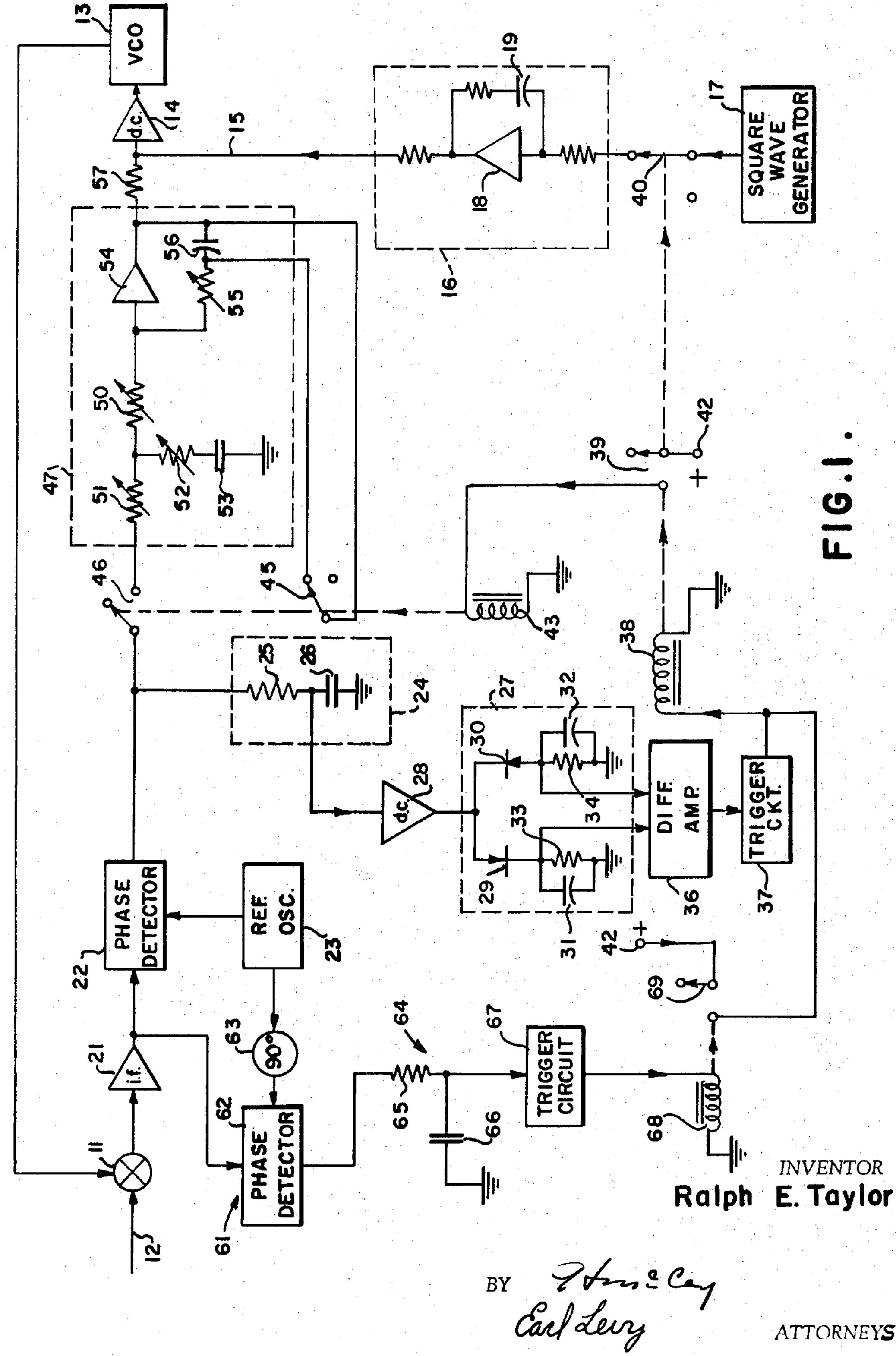

The invention described herein was made by an employee of the United States Government and may be manufactured and used by or for the Government for governmental purposes without the payment of any royalties thereon or therefor.

The present invention relates generally to frequency tracking systems and more particularly to a system for acquiring and tracking a variable frequency signal with a local oscillator having a relatively rapid sweep rate and a filter having a relatively rapid response time, wherein the system is switched from an acquisition mode to a tracking mode in response to the filter deriving a predetermined output level.

Phase locked loops are extensively employed in the prior art for tracking variable frequency sources. Phase locked loops are particularly useful for tracking variable frequency signals that are buried in extremely high noise level backgrounds, i.e., where there exists a very low signal-to-noise ratio. Prior art phase locked loops, however, usually are not generally suitable for acquiring a variable frequency signal, wherein the signal frequency is unknown.

A problem with prior art phase locked loops in acquiring signals having unknown frequencies is that the loop cannot be scanned at a relatively high rate compared to rates at which the frequency of the signal may vary. For instance, a typical prior art phase locked loop attempting to acquire or lock on to a frequency being swept at the rate of 10 kHz. per second over a range of 200 kHz. has a local oscillator with an output frequency that is swept at the rate of 20 kHz. per second. Hence, this typical prior art phase locked loop requires 10 seconds to sweep the entire 200 kHz. range where the signal may lie. Ten seconds are required with the prior art phase locked loop to sweep the entire range because the loop has the relatively narrow bandwith, on the order of 300 Hz. If the local oscillator frequency is swept at a higher rate than 20 kHz. per second, the loop does not have a fast enough response time to derive a positive indication of the signal lying within its band pass.

A solution to the problem would appear to be to expand the bandwidth of the loop, so that the response time of the loop is decreased to enable the loop local oscillator to be swept at a higher rate. Expanding the band pass of the phase locked loop, however, reduces the loop noise attenuating properties, thereby defeating one of the purposes of the loop.

According to the present invention, the acquisition time of the prior art phase locked loop is reduced from 10 seconds as a typical value to 1 second by increasing the local oscillator frequency sweep rate by a factor of 10 while the system is in the acquisition mode. It has been found that acquisition sensitivity of the phase locked loop according to the present invention is approximately the same as with prior art systems, whereby signals buried in noise at a minus 20 db signal-to-noise ratio can be detected in both cases. It is to be understood that the frequency sweeping rates and acquisition times set forth herein are merely exemplary, to provide an indication of the improved performance attained with the present invention.

To attain the faster acquisition times achieved with the present invention, the phase locked loop is opened and a filter having a relatively fast response time detects a beat frequency derived by mixing the variable input signal source with the output of a swept local oscillator. The filter is constructed so that as the beat frequency approaches a zero frequency value, the beat dwells in the filter for a time period at least equal to $1/2\pi B_p$, wherein $B_p$ is the band pass of the filter. The time in which the beat frequency dwells within the filter is:

$$\frac{2B_p}{\dot{f}_x+\dot{f}_d} \qquad (1)$$

where $$\dot{f}_d+\dot{f}_x$$

are the linear rate at which the input and local oscillator frequencies vary.

In response to the beat frequency dwelling within the filter for a sufficiently long time interval, the rate at which the local oscillator is linearly scanned is reduced, so that it varies at a rate no greater than the input signal $$\dot{f}_d$$

Because of the random nature in which the variable input signal to the loop may occur during the acquisition mode, the filter output is applied to a full wave, envelope detector. Thereby, if the filter output is either positive or negative in response to the beat frequency being either of the same or opposite polarity as the local oscillator, the local oscillator's scanning frequency is reduced.

According to a further feature of the invention, the loop is closed and maintained in a closed condition only if the beat frequency lies within a narrower frequency band than the filter pass band within a predetermined time interval after the filter output achieves a level to reduce the oscillator scanning rate. To this end, the beat frequency is passed through a second filter having a longer time constant than the previously described filter, and the output of this second filter must exceed a certain predetermined value within a predetermined time after the first filter achieved a set output voltage. If the second filter voltage does not achieve the set output voltage, the local oscillator is again swept at a relatively rapid rate and the phase locked loop is not closed. Thereby, if the first filter derives a predetermined output voltage in response to a spurious signal or noise, tracking of the local oscillator does not cease and the fast response filter remains effective to lock on to another beat frequency approaching a zero value.

In one embodiment of the invention, the phase locked loop is closed in response to the fast response filter achieving the predetermined output. In a second embodiment of the invention, however, the phase locked loop is closed only in response to the beat frequency achieving a zero frequency value.

The first named filter must have a relatively fast response time, with minimum propagation time delay. To this end, according to one embodiment of the invention, the filter comprises a resistance capacitance network, connected as a low pass, single pole network. In a second embodiment, the filter comprises a tuned parallel inductance capacitance resonant network, connected to be responsive to the heterodyned output resulting from mixing the local oscillator and variable input signals together.

It is, accordingly, an object of the present invention to provide a new and improved system for acquiring and tracking variable frequency signals.

Another object of the present invention is to provide a phase locked loop having acquisition times for unknown frequencies that are considerably faster than previously employed phase locked loops.

Still another object of the present invention is to provide a phase locked loop having a fast acquisition time for unknown frequencies, without sacrificing sensitivity to noise.

Still another object of the present invention is to provide a phase locked loop having a filter with a fast response time relative to a variable frequency being acquired in combination with a means for locking the loop permanently only when a signal having a desired frequency value is reached.

Figure 2A:
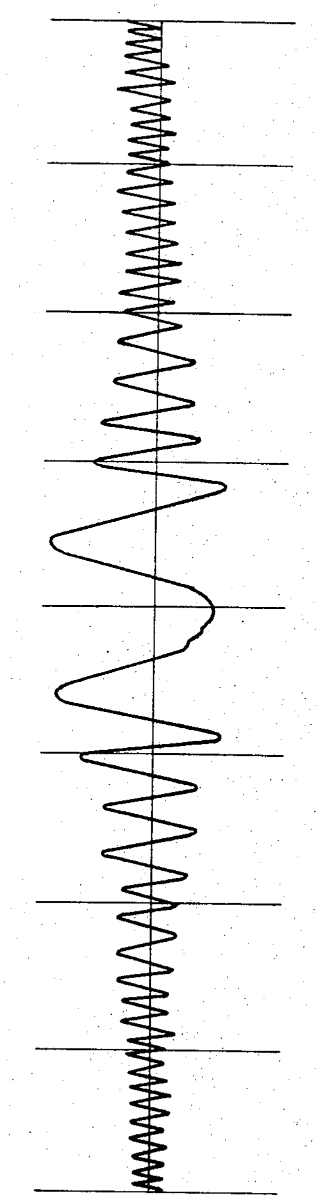
Figure 2B:
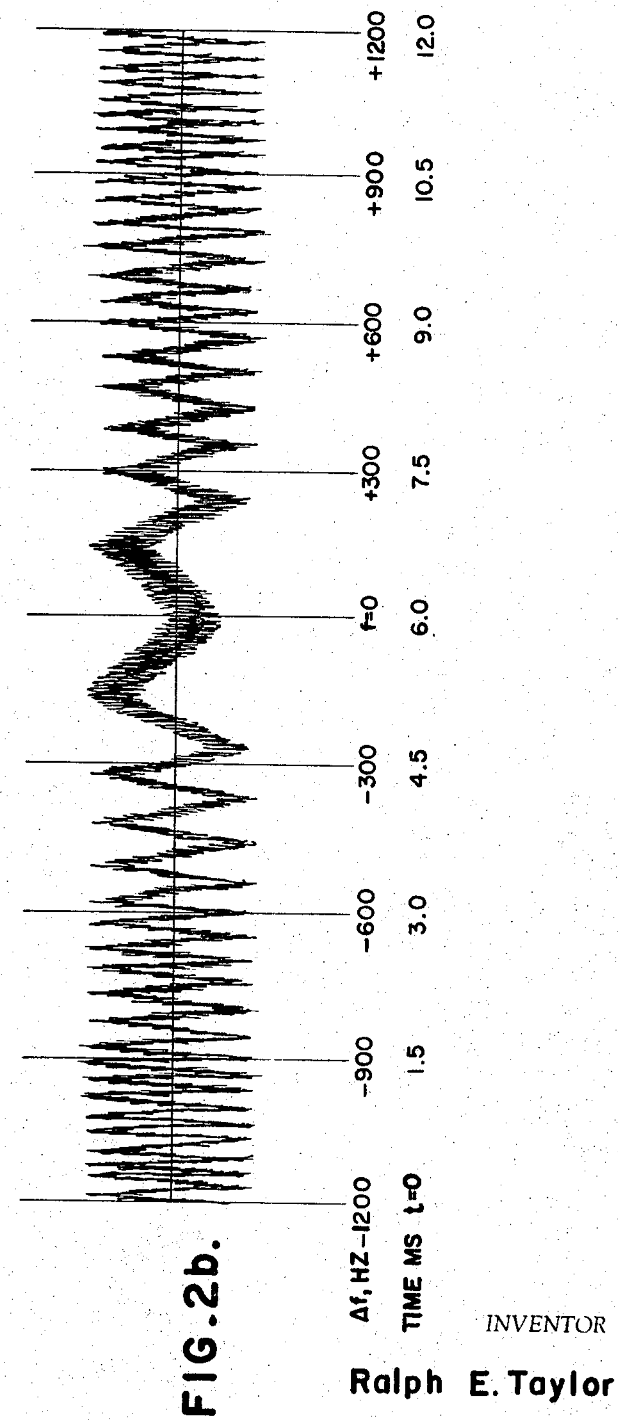
Figure 3:
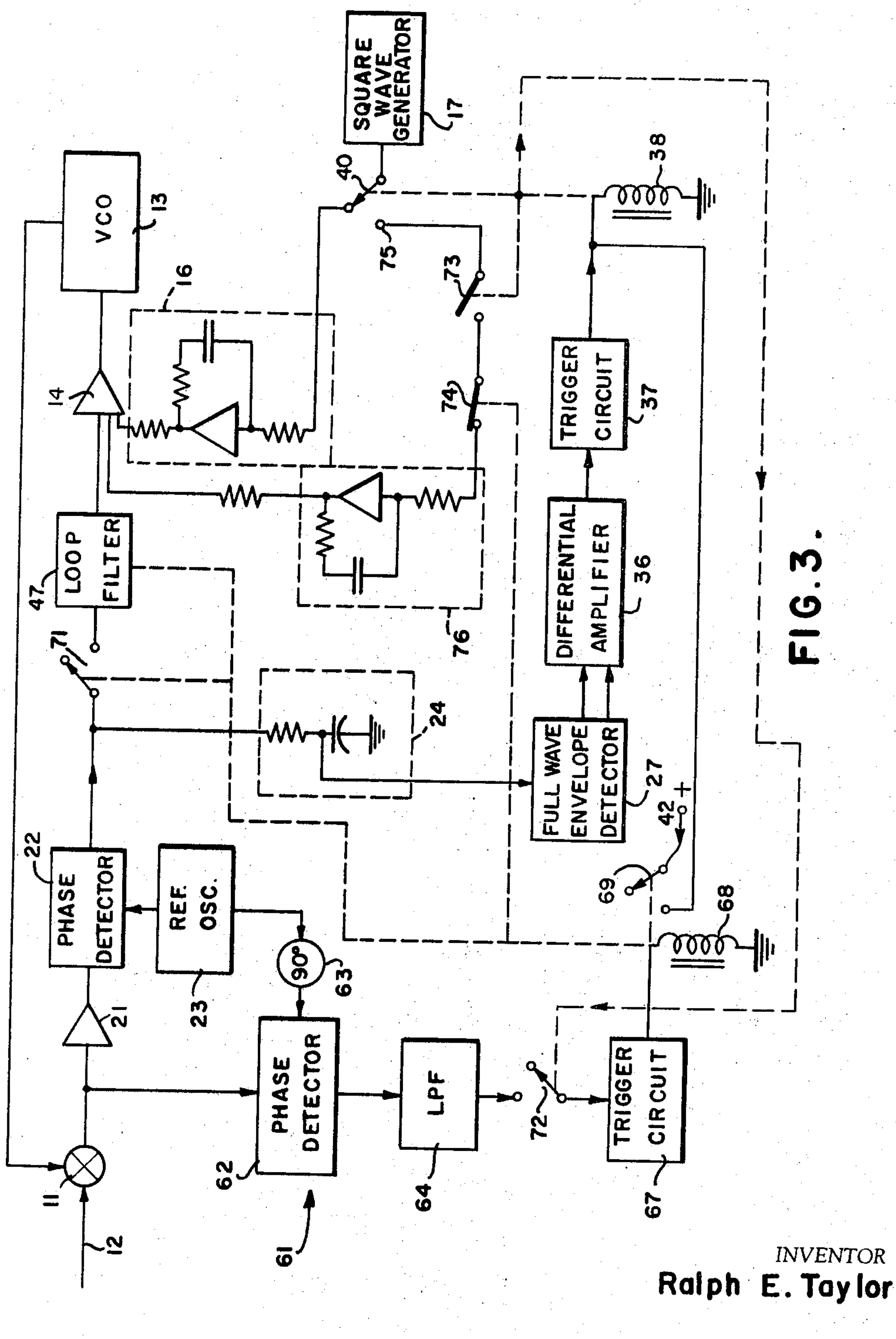
Figure 4:
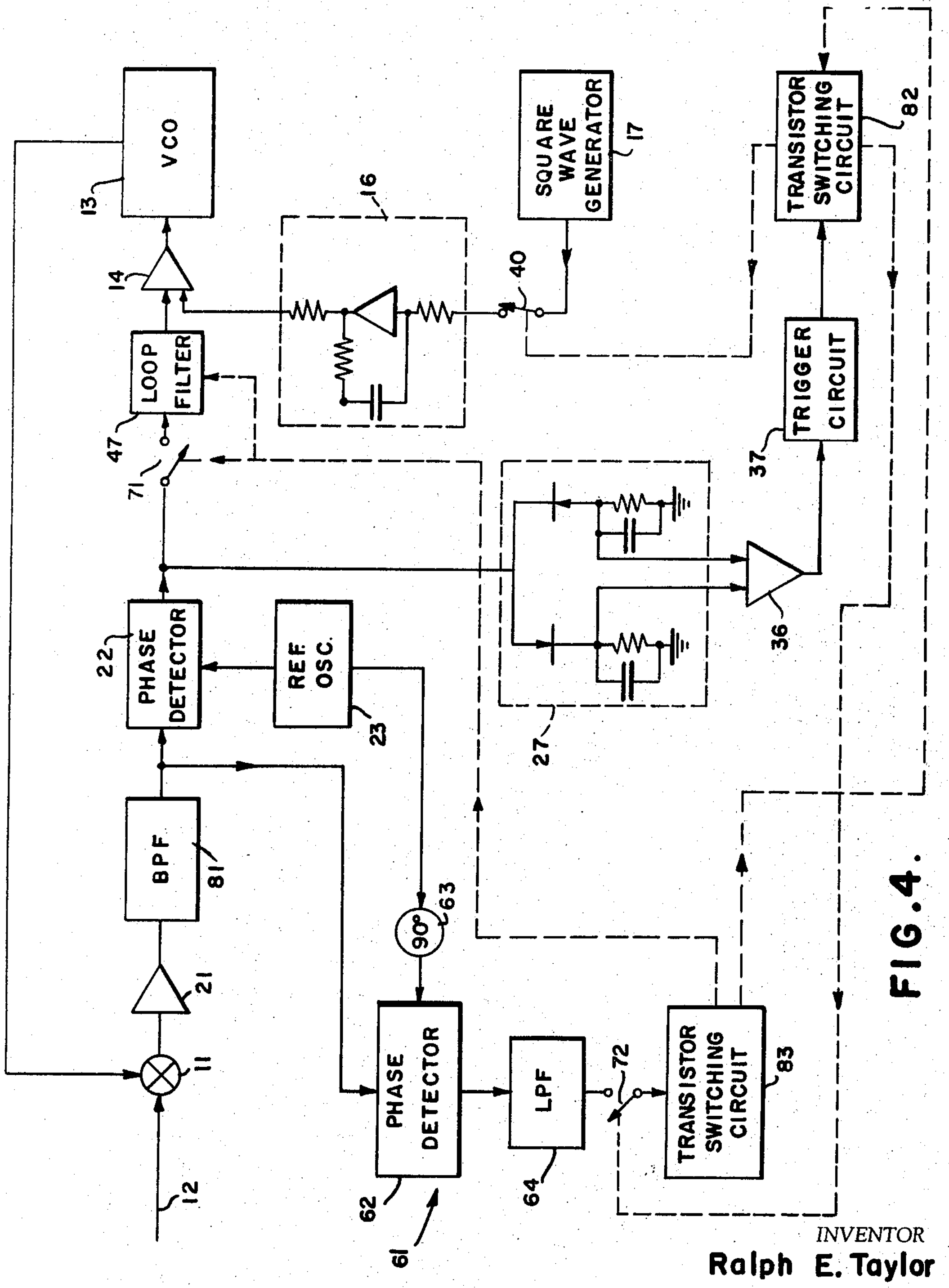

The above and still further objects, features and advantages of the present invention will become apparent upon consideration of the following detailed description of several specific embodiments thereof, especially when taken in conjunction with the accompanying drawings, wherein:

FIGURE 1 is a circuit diagram of one preferred embodiment of the present invention;

FIGURES 2*a* and 2*b* are waveforms to assist in analyzing the circuit of FIGURE 1;

FIGURE 3 is a circuit diagram of a second preferred embodiment of the invention; and FIGURE 4 is a circuit diagram of still another embodiment of the invention.

Reference is now made to FIGURE 1 of the drawings, where a variable frequency input signal is applied to mixer 11 by lead 12. The signal on lead 12, in one particular embodiment of the invention that was actually constructed, has a 42 megahertz center frequency, with variations of ±100 kilohertz. The frequency variations imposed on the 42 megahertz center frequency vary linearly as a function of time, so that the rate of change of frequency of the signal on lead 12, $$\dot{f}_d$$

is a constant. Such a signal is typically derived from a space vehicle entering the earth's atmosphere, with the frequency variaion being due to Doppler effect.

The signal on lead 12 is heterodyned in mixer 11 with the output of voltage controlled oscillator 13, having a center frequency of 38.5 megahertz. In the acquisition mode of the present invention, the frequency of voltage controlled oscillator 13 is varied about the 38.5 megahertz value by ±100 kilohertz in response to a triangular wave output coupled to the oscillator through DC amplifier 14 from lead 15. The triangular waveform on lead 15 is derived from integrator 16 that is driven by square wave generator 17. Integrator 16 is of the conventional analog computer type and includes a DC operational amplifier 18 having a feedback capacitor 19. Square wave generator 17 has a repetition rate of one cycle per second, whereby integrator 16 derives triangular waves having a period of one cycle per second. The slope of the triangular waves derived from integrator 16 is such that local oscillator 13 is scanned in a linear manner to derive a constantly varying output frequency, $$\dot{f}_x$$

having a rate of 200 kilohertz per second. It should be noted that experimental evidence has shown that reliable phase lock acquisition can occur for values of $$\dot{f}_x$$

up to at least 1,000 kilohertz per second.

The variable frequency signals on lead 12 and derived from local oscillator 13 are heterodyned in mixer 11, the output of which has a lower side band centered at 3.5 megahertz. The 3.5 megahertz IF or intermediate frequency output of mixer 11 includes a beat frequency that is equal to the difference between the departures from the center frequencies of the signal on lead 12 and the output of local oscillator 13. The beat frequency can lie anywhere within 200 kilohertz of the 3.5 megahertz signal derived by mixer 11. The output of mixer 11 is coupled to IF amplifier 21, having a center frequency of 3.5 megahertz. The amplified output of IF amplifier 21 is applied to phase detector 22, that is driven with a coherent 3.5 megahertz input from reference oscillator 23 to derive a beat frequency. Phase detector 22 is arranged so that positive and negative maximum DC voltages are derived therefrom when the two inputs thereof are 90 degrees out-of-phase. The phase detector generates a zero output voltage in response to the outputs of IF amplifier 21 and reference oscillator 23 being in phase exactly, i.e., at zero phase with respect to each other.

The output of the phase detector 22, the detected beat frequency, is applied to the input of acquisition filter 24, that comprises 100 kilohm resistor 25 in series with 0.0047 microfarad capacitor 26. Filter 24, thereby comprises a single pole, low pass filter having a cutoff frequency of approximately 300 hertz and a time constant of approximately 0.5 millisecond. While filter 24 is conventionally known as a low pass filter, it is considered as a band pass filter generically, with the pass band being between zero and 300 hertz per second. If "negative" frequencies are assumed to exist, the pass band of filter 24 is centered at 0 hertz and extends to ±300 hertz. The values of resistor 25 and capacity 26 are selected so that a 300 hertz output of phase detector 22, commensurate with a 300 hertz departure from the 3.5 megahertz signal in IF amplifier 21, dwells within filter 24 for a time period at least equal to $1/1\pi B_p$. For the particular values of resistor 25 and capacitor 26 stated, the value of $1/2\pi B_p$ is 0.53 millisecond. The time during which the beat frequency output of phase detector 22 dwells in low pass or band pass filter 24 is given by Equation 1. Substituting the values $B_p=300$ hertz, $$\dot{f}_x=200\times10^3 \text{ hertz per second and } \dot{f}_d=10\times10^3$$

hertz per second into Equation 1 yields a minimum dwell time for the beat frequency of 2.9 milliseconds. Since the beat frequency will therefore dwell within filter 24 for a considerable time period when it lies within the frequency range ±300 hertz, a substantial DC voltage is derived by filter 24 across capacitor 26.

To measure the DC voltage at the output of filter 24, the voltage developed across capacitor 26 is applied to full wave envelope detector 27 through DC amplifier 28. Envelope detector 27 includes diodes 29 and 30, that are poled oppositely with respect to the output of amplifier 28 to drive storage capacitors 31 and 32, respectively. Capacitors 31 and 32 are respectively shunted by relative resistors 33 and 34 which enable a differential voltage to be developed across the capacitors in response to an output of filter 24 that is less than 300 hertz.

The voltages developed across capacitors 31 and 32 are applied to opposite polarity inputs of differential, DC amplifier 36. Amplifier 36 drives trigger circuit 37, having a variable threshold value that can be manually adjusted. Differential amplifier 36 and trigger circuit 37 are arranged so that the latter circuit derives a positive output pulse in response to the differential amplifier generating a DC level exceeding a predetermined magnitude.

With the system in the acquisition mode and a relatively high frequency beat being derived from phase detector 22, filter 24 derives a relatively low amplitude sinusoidal voltage. The sinusoidal output of filter 24 is applied by diodes 29 and 30 equally to capacitors 31 and 32, whereby the capacitors are charged to substantially the same voltage. Since capacitors 31 and 32 are charged to approximately the same voltage, differential amplifier 36 generates a relatively low output signal and trigger circuit 37 is not activated. When, however, the output of phase detector 22 is an AC signal within the band pass of filter 24, an appreciable DC voltage is developed across capacitor 26. The DC voltage developed across capacitor 26 causes one of capacitors 31 or 32 to be charged to a greater voltage than the other, whereby a finite output voltage is applied to trigger circuit 37 by amplifier 36. In response to the finite voltage applied to trigger circuit 37 exceeding the triggering level set therein, the trigger circuit develops an output pulse.

Variations of the output voltage of filter 24, across capacitor 26, as a function of time for different swept relative frequencies on lead 12 and the output of local oscillator are illustrated graphically by the waveform of FIGURE 2*a*. At the left portion of FIGURE 2*a*, where time, $t$, equals zero, the beat frequency derived from mixer 11 departs 1200 hertz from the 3.5 megahertz frequency, whereby phase detector 22 derives a sinusoid having a frequency of 1200 hertz. The 1200 hertz output of phase detector 22 is severely attenuated by filter 24, whereby a relatively low AC voltage is developed across capacitor 26 and capacitors 31 and 32 are equally charged to prevent activation of trigger circuit 37.

As time progresses, the inputs to mixer 11 causes the beat frequency to decrease in value, with a corresponding decrease in the frequency of the phase detector 22 output. With lower and lower output frequencies of phase detector 22, the dwell time of the phase detector output in filter 24 increases, whereby the voltage developed across capacitor 26 increases. As seen from FIGURE 2*a*, the AC output voltage of filter 24 for a beat frequency of 600 hertz, $t=3.0$ milliseconds, is approximately 1.5 times as great as the AC voltage when the beat frequency was 1200 hertz, at $t=0$ seconds. At time $t=4.5$ milliseconds, when there is a 300 hertz frequency generated by phase detector 22, the output of filter 24 is not quite large enough to cause activation of trigger circuit 37. As time progresses, however, to $t$ being slightly greater than 4.5 milliseconds, a negative peak is generated by filter 24, whereby capacitor 32 is charged to a voltage considerably in excess of the previous maximum voltage stored by capacitor 31.

In response to the difference in DC voltages applied to amplifier 36 at $t$ being slightly greater than 4.5 milliseconds, trigger circuit 37 is activated and remains activated for a predetermined time interval that is large compared to the time constant formed by resistor 65 and capacitor 66 in low pass filter 64 regardless of the amplitude of the input applied thereto. Thereby, as the output voltage across capacitor 26 goes through a zero value at time $t=6.0$ milliseconds, trigger circuit 37 still drives a positive output voltage.

A comparison of FIGURES 2*a* and 2*b* illustrates the meritorious effects introduced into the circuit by filter 24. FIGURE 2*b* is a waveform derived from phase detector 22 in a configuration wherein filter 24 was open circuited from the phase detector output. It is noted from FIGURE 2*b* that the phase detector output envelope level remains constant as a function of beat frequency. The waveforms illustrated by FIGURES 2*a* and 2*b* are reproductions of actual oscillograph traces taken of an input signal buried in 20 db of noise. The waveform indicated by FIGURE 2*b* of the phase detector 22 output, without filter 24 being present, has a considerable noise level thereon. Hence, the simple low pass or band pass filter 24 of the present invention provides a means for sensing when the beat frequency comes within a predetermined frequency range and effectively removes noise superimposed on the input signal at lead 12.

Consideration is now given to the circuitry for tracking the signal on lead 12 once a pulse is derived by trigger circuit 37 in response to the input signal being acquired. When energized to derive a positive output pulse, trigger circuit 37 activates relay 38, having a relatively fast response time of 1.5 milliseconds or less and a release time of at least 0.2 second. Relay 38 energizes normally open contacts 39 and normally closed contacts 40, the latter being connected in series between integrator 16 and square wave generator 17. Thereby, the voltage of integrator 16 remains at a constant level for some predetermined time when relay 38 is energized, and the output frequency of voltage controlled oscillator 13 is no longer swept by the output of DC amplifier 14, as coupled thereto by lead 15, but is maintained at the same frequency that caused a beat frequency output of phase detector 22 to activate filter 24 so that trigger circuit 37 is energized. Simultaneously with oscillator 13 being no longer swept in response to the output of integrator 16, contacts 39 supply the positive DC voltage at terminal 42 to the coil of relay 43, having pull-in and release times of approximately 5 milliseconds. Relay coil 43 activates normally closed contacts 45 and normally open contacts 46, which connect the output of phase detector 22 to the input of loop filter 47.

Loop filter 47 is of the low pass type, having a bandwidth on the order of 300 hertz, and includes a pair of poles having different frequencies. In particular, loop filter 47 include a pair of cascaded low pass filters or integrators, with the first low pass filter including only passive elements while the second filter has active elements therein to provide the required high gain of the loop. The passive section of loop filter 47 comprises resistor 51 that is shunted to ground through resistor 52 and capacitor 53. The voltage developed across the series combination of resistor 52 and capacitor 53 is applied to the input of operational DC amplifier 54 by resistor 50. Connected in the feedback loop of amplifier 54 are the series combination of resistor 55 and capacitor 56, the electrodes of which are normally short circuited by contacts 45. Contacts 45 bridge capacitor 56 while the system is in the acquisition mode so that any residual charge maintained across the capacitor plates is not applied to voltage controlled oscillator 13. The output of amplifier 54 is coupled to the input of DC amplifier 14 through isolating or summing resistor 57, whereby amplifier 14 responds to the sum of the output voltages of integrator 16 and loop filter 47.

Once contacts 45 and 46 are opened and closed, respectively, voltage controlled oscillator 13 tracks the input signal on lead 12 in a manner well known to those skilled in the art. Because loop filter 47 includes two poles, the closed loop is considered as a third order loop and is particularly adapted for tracking input frequencies that are linearly variable. The closed tracking loop including local oscillator 13, mixer 11, phase detector 22 and loop filter 47 has a bandwidth of 300 hertz for loop noise on one side of the center frequency of the signal applied to mixer 11 on lead 12. With the tracking loop utilized with the present invention, loop bandwidth is calculated as:

$$B_L=0.33K_1K_2R_0R_1/R_2R_3 \qquad (2)$$

where:

$K_1$ is the gain of phase detector 22, in DC volts per radians, $K_2$ is the gain of voltage controlled oscillator 13 in radians per second per unit DC input voltage, $R_0$ is the value of resistance 52, $R_1$ is the value of resistance 55, $R_2$ is the value of resistance 51, and $R_3$ is the value of resistance 50.

Because of the requirement for maintaining the tracking loop bandwidth $B_L$, relatively narrow at a predetermined value of approximately 300 hertz, and the values of resistors 51, 52, 55 and 50 are determinative of the value of $B_L$, each of these resistors is made variable.

To enable the tracking loop incorporated in the present invention to remain closed for an interval longer than the activation time of relay 38 while a signal with a beat frequency within the desired band of 30 hertz is received on lead 12, network 61 is provided. Network 61 includes phase detector 62, constructed substantially the same as phase detector 22. Phase detector 62 is responsive to the output of IF amplifier 21, centered at a frequency of 3.5 megahertz. The other input to phase detector 62 is derived from the 3.5 megahertz output of reference oscillator 23, as modified in phase by 90 degree phase shifter 63. Since the coherent inputs to phase detectors 22 and 62 from reference oscillator 23 are 90 degrees displaced, the latter phase detector derives a zero output voltage when the former detector is deriving maximum DC output voltages. Similarly, phase detector 62 generates maximum DC output voltages while phase detector 22 is generating zero voltages. Thus, phase detector 62 generates a maximum output voltage when the beat frequency equals zero and is at zero phase, referenced to the output of oscillator 23 and can be considered as a signal multiplier, while phase detector 22 derives a zero output voltage under such circumstances.

The detected beat frequency output of phase detector 62 is applied to low pass filter 64 comprising resistor 65 and shunt capacitor 66. The values of resistors 65 and capacitor 66 are selected so that the time constant of filter 64 is at least 10 times as great as the time constant of filter 24. Hence, any noise propagating through phase detector 62 is even more greatly attenuated in filter 64 than in filter 24 and the dwell time of the voltage coupled to filter 64 by detector 62 required to charge capacitor 66 to a relatively large value is greater than for filter 24. These requirements insure that a relatively large voltage is developed across capacitor 66 only when the beat frequency is 30 hertz or less. Hence, the probability of a relatively large voltage being developed across capacitor 66 in response to a spurious input signal is virtually mitigated.

The output voltage of filter 64, across capacitor 66, is applied to the input of trigger circuit 67. Trigger circuit 67 is constructed so that it derives a constant amplitude output level in response to the voltage across capacitor 66 reaching a predetermined magnitude, that can be set at will. The constant amplitude level generated by trigger circuit 67 in response to the output of filter 64 is applied as an energizing potential to relay coil 68, having pull-in and release times on the order of 5 milliseconds.

Energization of relay 68 closes normally open contacts 69. Contacts 69, when closed, couple the positive DC voltage at terminal 42 to relay 38, thereby energizing the latter relay and locking contacts 39 and 40 in the closed and open states, respectively. With relay 38 locked into an energized state in response to closure of contacts 69, the phase locked loop remains in the closed configuration, as determined by the closed and open circuited conditions of contacts 46 and 45, responsive to the energized state of relay 43.

Reference is now made to FIGURE 3 of the drawings, wherein there is illustrated still another embodiment of the invention that differs from the embodiment of FIGURE 1 in several aspects. In FIGURE 3, the phase locked loop is not closed in response to the output of filter 24 achieving a predetermined magnitude. Instead, relay 38 transfers the square wave generator 17 output from contact 40 to contact 75, closes contact 73, and closes contact 72. This action allows the variable frequency oscillator 13 to sweep at the slow rate for acquisition since the output from square wave generator 17 is applied through integrator circuit 76 to amplifier 14, as described in detail hereinafter.

The phase locked loop is not closed simultaneously with filter 24 deriving a voltage sufficient to activate relay 38 but is closed only after trigger 67 has been supplied with a sufficiently large magnitude voltage by low pass filter 64. To this end, relay 68, responsive to the output of trigger circuit 67, closes contact 71, connecting phase detector 22 to the input of loop filter 47 while open circuiting the contact which normally bridges capacitor 56 thereof (as shown in FIGURE 1) of the phase locked loop filter. To prevent trigger circuit 67 from responding to a spurious voltage, that might occur before the atcivation of trigger circuit 37, trigger 67 and the output of filter 64 are connected together by normally open contact 72, energized to the closed condition in response to activation of relay coil 38 by trigger circuit 37.

In the embodiment of FIGURE 3, the reception of a desired signal on lead 12 causes a zero beat frequency to be derived by phase detectors 22 and 62. The zero beat frequently derived by phase detector 62 results in a substantial positive voltage being applied to low pass filter 64 with subsequent activation of relay 68. Relay 68 is energized at a sufficient high speed to close contacts 71 so that the phase locked loop is closed when the beat frequency is equal to zero. Contact 74 simultaneously opens and the slow scan rate stops allowing the phase locked loop to lock. Relay 68 also provides a holding voltage for relay 38 via positive terminal 42.

According to this configuration, activation of trigger circuit 37 causes the frequency of oscillator 13 to be swept at a rate approximately equal to the expected rate at which the frequency on lead 12 changes and the loop is closed when the beat frequency is equal to zero. In response to the loop being closed, all sweeping of voltage controlled oscillator 13 terminates.

Changing the sweep rate of oscillator 13 is accomplished by providing relay 38 with normally open circuited contact 73 while relay 68 is provided with normally closed circuited contact 74. Contacts 73 and 74 are series connected with each other and the normally open circuited terminal 75 of contact 40 to feed the output of square generator 17 selectively to the input of integrator 76 on operation of relay 38. Integrator 76 is constructed substantially the same as integrator 16 but has a time constant equal to ten times that of the latter integrator. In the interval when relay 38 is energized while relay 68 is deactivated, contacts 40, 73 and 74 couple the output of square wave generator 40 to the input of integrator 76. Integrator 76 derives a sawtooth voltage having a slope $\frac{1}{10}$ that derived from integrator 16 when it is connected to be responsive to the output of square wave generator 17. Thereby, a slowly varying voltage is applied to voltage controlled oscillator 13 through summing amplifier 14 and the frequency of the oscillator continues to vary, to enable a zero beat frequency to be derived from phase detectors 22 and 62. Since a zero beat frequency is positively derived from phase detector 62 regardless of the variations of the input signal on lead 12, as long as the input signal remains in the frequency band desired, relay 68 is energized to close contacts 71 and establish the phase locked loop.

In the event relay 68 does not activate within 0.2 second, being the time constant of trigger circuit 37, contact 73 again opens and contact 40 closes returning the variable frequency oscillator 13 to the fast sweep rate for broadband sweeping.

It is noted that the output voltage of oscillator 13 never undergoes a step function change when integrator 76 is utilized. Of course, it is desired for the oscillator output frequency to be varied in a smooth manner, rather than abruptly, to enable the detector process to remain coherent. Step function variations of oscillator 13 are prevented because the voltage applied to the oscillator by integrator 16 remains constant and zero voltage is derived from integrator 76 in response to closure of contact 73.

In response to the phase locked loop being closed by energization of relay 68, voltage controlled oscillator 13 is controlled only by the output of phase detector 22. The output of integrator 76 remains constant, at the voltage existing across it at the instant when relay 68 was energized, because of the storage properties of the capacitor in the integrator and open circuiting of contacts 74 in response to energization of relay 68. Open circuiting of contacts 74 prevents the further application of voltage by square wave generator 40 to the integrator 76 input whereby the integrator output does not change.

Reference is now made to FIGURE 4 of the drawings, wherein there is illustrated still another embodiment of the present invention. The embodiment illustrated by FIGURE 4 is very similar to the embodiment of FIGURE 3, but the simple low pass filter 24 has been replaced with band pass filter 81, between the output of IF amplifier 21 and the input of phase detectors 22 and 62. Filter 81 comprises a parallel inductance capacitance tank circuit, resonant at 3.5 megahertz and with a bandwidth of 600 hertz between its 3 db points. Filler 81 responds to the beat frequency between the offset frequencies applied to mixer 11 in exactly the same manner as low pass filter 24, FIGURE 1. Filter 81 has a 600 hertz bandwidth rather than a 300 hertz bandwidth, because it must accommodate the frequencies on either side of the IF center frequency. The IF frequencies to one side of the center frequency appear as "negative" frequencies as applied to filter 24. To detect the beat frequencies derived with the network of FIGURE 4, the output of phase detector 22 is applied directly to the input of envelope detector 27.

One further difference in the circuit of FIGURE 4 relative to the circuit of FIGURE 3 is that relays 38 and 68 have been replaced with transistor switching circuits 82 and 83, respectively. The transistor switching circuits 82 and 83 function virtually identically with the corresponding relays but have much faster activation times, on the order of microseconds. Transistor switching circuit 82, however, has a relatively long release time, substantially the same as the 0.2 second release time of relay 38. While electromechanical switches have been illustrated in FIGURE 4 as being responsive to transistor circuits 82 and 83 for purposes of convenience, it is understood that electronic switches responsive to the output voltages on circuits 82 and 83 are actually employed. An interlock connection must be made from transistor switching circuit 83 to 82 to provide a voltage to hold contact 40 open when transistor switching circuit 83 is activated.

While I have described and illustrated several specific embodiments of my invention, it will be clear that variations of the details of construction which are specifically illustrated and described may be made without departing from the true spirit and scope of the invention as defined in the appended claims.

I claim:

1. A system for locking on to an input source of variable frequency comprising:

a local oscillator means for deriving a variable frequency in response to a signal level applied thereto;

translating means connected to said source and to said oscillator means for deriving a signal including a beat frequency and having an output responsive to said beat frequency;

sweeping means connected to said local oscillator means for sweeping the frequency thereof at a predetermined rate;

coupling means connected between said translating means and said local oscillator means; and switching means, connected to said output of said translating means, cooperating with said sweeping means and said coupling means in response to an output of said translating means exceeding a set level for reducing the rate said local oscillator means is swept by said sweeping means and for controlling said coupling means to permit it to pass said beat frequency as the variable signal level to said oscillator means only in response to said beat frequency lying in a predetermined frequency band within a selected time interval after said output of said translating means exceeds said set level.

2. The system of claim 1 wherein said switching means includes means for controlling said coupling means such that said beat frequency is coupled as a variable signal level to said oscillator means in response to the output from said translating means exceeding said set level.

3. The system of claim 1 wherein said switching means includes means for reducing the sweep rate of said oscillator means in response to the output of said translating means exceeding the set level.

4. The system of claim 1 wherein said switching means includes means for reducing the oscillator sweep rate by said sweeping means by an order of magnitude within said interval and for further reducing the oscillator sweep rate by said sweeping means substantailly to zero in response to said beat frequency lying in said frequency band within said interval.

5. The system of claim 1 wherein said translating means includes:

mixing means for heterodyning the frequencies of said oscillator means and said source;

detector means, connected to said mixing means, for deriving said beat frequency signal; and band pass filter means responsive to said beat frequency and connected between said detector means and said switching means.

6. The system of claim 5 wherein said oscillator means, said mixing means, said detector means, and said coupling means form a phase locked loop when said beat frequency is coupled as the variable signal level to said oscillator means; and said coupling means includes a relatively narrow band filter, the output of said filter being coupled to said oscillator means for controlling the phase and frequency thereof.

7. The system of claim 6 wherein said narrow band filter includes an amplifier having a feedback capacitor and means for discharging said capacitor only while the beat frequency is not coupled to said oscillator means.

8. The system of claim 5 wherein said mixing means includes means for deriving an intermediate frequency signal with a finite center frequency and means for coupling said intermediate frequency signal to said detector means;

said detector means includes a phase detector and a reference source coupled to said phase detector for furnishing a signal thereto equal in frequency to said center frequency; and said band pass filter means includes a low pass filter responsive to the output of said phase detector.

9. The system of claim 5 wherein said translating means includes another filter connected between said detector means and said switching means and having a response time on an order of magnitude greater than said band pass filter.

10. The system of claim 1 wherein said translating means includes:

mixing means for heterodyning the frequencies of said oscillator means and said source;

band pass filtering means connected to said mixing means; and detector means, connected between said band pass filtering means and said switching means, for deriving said beat frequency signal.

11. The system of claim 10 wherein said translating means includes another filter connected between said detector means and said switching means and having a response time on an order of magnitude greater than said band pass filter.

12. The system of claim 10 wherein said oscillator means, said mixing means, said band pass filtering means, said detector means and said coupling means form a phase locked loop when said beat frequency is coupled as the variable signal level to said oscillator means; and said coupling means includes a relatively narrow band filter, the output of which is coupled to said oscillator means for controlling the phase and frequency thereof.

13. The system of claim 1 wherein said translating means includes a band pass filter and wherein said sweeping means includes means for linearly sweeping the frequency of said oscillator means at a rate $$\dot{f}_x$$

hertz per second, where $$\dot{f}_x$$

is at least an order of magnitude greater than $$\dot{f}_d$$

the rate at which said input source linearly varies, said band pass filter having a band pass band, $B_p$; said switching means being responsive to an output of said filter for reducing the sweeping rate of the oscillator frequency by said sweeping means to a rate no greater than $$\dot{f}_d$$

in response to said beat frequency dwelling within said band pass filter for a time period at least equal to $1/2\pi B_p$ wherein the minimum time said beat frequency dwells within said filter is $$\frac{2B_p}{\dot{f}_x+\dot{f}_d}$$

14. A system for locking on to an input source of frequency linearly variable over a predetermined band at a rate $$\dot{f}_d$$

hertz per second comprising:

a local oscillator deriving a variable frequency in response to a signal level applied thereto;

translating means connected to said source and said local oscillator for mixing the frequencies thereof and thereafter deriving a signal including a beat frequency;

sweeping means connected to said local oscillator for linearly sweeping the frequency of said oscillator at a rate $$\dot{f}_x$$

hertz per second, where $$\dot{f}_x$$

is at least an order of magnitude greater than $$\dot{f}_d$$

a band pass filter connected to said translating means and responsive to said beat frequency, said filter having a pass band $B_p$;

switching means responsive to an output of said filter for reducing the sweeping rate of the oscillator frequency by said sweeping means to a rate no greater than $$\dot{f}_d$$

in response to said beat frequency dwelling within said filter for a time period at least equal to $1/2\pi B_p$, wherein the minimum time said beat frequency dwells within said filter is $$\frac{2B_p}{\dot{f}_x+\dot{f}_d}$$

and coupling means connected between said translating means and said oscillating means and responsive to said beat frequency being within a predetermined band for coupling said frequency to said oscillator.

References Cited

UNITED STATES PATENTS

| | | | |
|---|---|---|---|
| 2,833,923 | 5/1958 | Gruen | 331—4 |
| 2,896,074 | 7/1959 | Newsom et al. | 331—4 X |
| 2,933,598 | 4/1960 | Heller et al. | 331—4 X |

ROY LAKE, *Primary Examiner.*

S. H. GRIMM, *Assistant Examiner.*

U.S. Cl. X.R.

331—17, 25; 325—420